United States Patent
Riddle (10) Patent No.: US 12,280,624 B2
(45) Date of Patent: Apr. 22, 2025

(54) SELF-ALIGNING, ROTATING D-RING FOR RECOVERY VEHICLES

(71) Applicant: Coty L. Riddle, Chickamauga, GA (US)

(72) Inventor: Coty L. Riddle, Chickamauga, GA (US)

(73) Assignee: Miller Industries Towing Equipment Inc., Ooltewah, TN (US)

(*) Notice: Subject to any disclaimer, the term of this patent is extended or adjusted under 35 U.S.C. 154(b) by 816 days.

(21) Appl. No.: 17/499,055

(22) Filed: Oct. 12, 2021

(65) Prior Publication Data

US 2023/0115353 A1    Apr. 13, 2023

(51) Int. Cl.
- *B60D 1/24* (2006.01)
- *B60D 1/36* (2006.01)
- *B60D 1/48* (2006.01)

(52) U.S. Cl.
CPC ............... *B60D 1/247* (2013.01); *B60D 1/36* (2013.01); *B60D 1/488* (2013.01)

(58) Field of Classification Search
CPC .......... B60D 1/247; B60D 1/488; B60D 1/36; B66C 1/66; B66C 1/666
USPC ....................................................... 294/215
See application file for complete search history.

(56) References Cited

U.S. PATENT DOCUMENTS

| | | | |
|---|---|---|---|
| 3,782,061 A * | 1/1974 | Minutoli | E04B 1/06 52/298 |
| 4,487,396 A | 12/1984 | Hoffman | |
| 4,669,618 A * | 6/1987 | Brand | B66C 1/34 294/215 |
| 4,708,382 A * | 11/1987 | LaCount | B66C 1/34 59/95 |
| 4,907,921 A * | 3/1990 | Akright | B61D 45/001 410/111 |
| 5,052,869 A * | 10/1991 | Hansen, II | B60P 7/0807 410/101 |
| 5,180,263 A * | 1/1993 | Flowers, Jr. | B60P 7/0807 410/101 |
| 5,248,176 A | 9/1993 | Fredriksson | |
| 5,823,588 A * | 10/1998 | Morghen | B66C 1/66 403/164 |
| 6,022,164 A | 2/2000 | Tsui | |
| 6,038,500 A * | 3/2000 | Weiss | B60W 10/06 701/41 |
| 7,014,230 B1 | 3/2006 | Hung | |
| 8,424,638 B1 * | 4/2013 | Guthrie | E04G 21/3276 248/499 |
| 11,192,760 B1 * | 12/2021 | Nadiadi | B66C 13/08 |
| 2002/0164198 A1 | 11/2002 | Alba | |

(Continued)

OTHER PUBLICATIONS

International Search Report and Written Opinion, Nov. 18, 2022.

*Primary Examiner* — Paul T Chin
(74) *Attorney, Agent, or Firm* — Michael P. Mazza; Michael P. Marra, LLC (57) ABSTRACT

A rotating, self-aligning device ("D-ring assembly") mounted on or associated with a recovery vehicle for supporting and pulling a load, and a method of using this device, which includes an outer housing rigidly attached to the recovery vehicle; and a rotating base plate, with a bearing for supporting a shackle. The device automatically self-aligns along a centerline of the shackle relative to the direction of the load.

19 Claims, 13 Drawing Sheets

(56) References Cited

U.S. PATENT DOCUMENTS

2012/0099922 A1     4/2012   Horikawa et al.
2013/0082477 A1     4/2013   Fuller et al.

\* cited by examiner

SELF-ALIGNING, ROTATING D-RING FOR RECOVERY VEHICLES

BACKGROUND OF THE INVENTION

The present invention generally relates to recovery vehicles and, more specifically, to a D-ring/shackle used by a recovery vehicle to recover disabled vehicles.

Recovery vehicles such as tow trucks and car carriers typically employ a motorized winch with a steel cable or rope for pulling loads, such as disabled vehicles, from the rear or sides of the recovery vehicle. Conventional D-ring shackles (also known as "clevis," "hitch" or "tow" shackles) are used as a permanent lifting point and intended for straight line pulling as side pulls can twist or bend the D-shaped shackles. Shackles or D-rings may be used to direct the pulling of a load.

A conventional D-ring, used in the towing and recovery industry, is typically mounted on a fixed plate. These plates have holes for a pin, and a pin secures the D-ring to the fixed plate. This design permits only a single degree of freedom for the D-ring to move, and concentrates the load to a single point, thereby limiting its load capacity. D-rings are also not designed to be side-loaded, and their ideal loading capacity must therefore be reduced as the angle of the load is increased from the centerline of the D-ring. In the past, this problem was solved by adding multiple D-rings at different angles to allow the D-ring to be loaded in a manner approximating its ideal loading capacity. In the field, however, D-rings are rarely used at their ideal loading capacity; instead, they are almost always loaded at some angle that is not ideal to the design intent, with incurring corresponding torsional/shearing forces that can result in D-ring pin failure, as one prominent example. When recovery vehicles for disabled vehicles are involved, such failures can have serious consequences. (As an example, in the towing industry, wire cable breaking strengths may be in the range of about 20,000-50,000 pounds, so the D-ring assembly may be designed to have a load capacity in about this range, although for certain applications it may be advantageous to design for lower or higher such ranges.)

Hoist rings are known rigging hardware used as a securement point during an overhead lift, generally used in the overhead crane industry. The hoist ring is typically secured by a single bolt. A drawback of this design is that it concentrates the load to a single point, thereby limiting the load capacity of the design. Hoist rings are not specifically designed for heavy side pulling as used in the recovery industry.

Accordingly, there is a need for a D-ring that can self-align to a given load to provide the ideal load case for the D-ring, allowing the D-ring to be used in a more versatile manner. This will also decrease the number of D-rings needed on a vehicle, reducing its weight. Preferably, the new D-ring will be able to rotate up to 360° about a center axis, and pivot preferably 180° normal to the center of rotation.

SUMMARY OF THE INVENTION

The objects mentioned above, as well as other objects, are solved by the present invention, which overcomes disadvantages of prior D-rings, while providing new advantages not previously associated with them. This summary is provided to introduce a selection of concepts in a simplified form that are further described below in the Detailed Description, so that the claimed invention may be better understood. However, this summary is not intended to limit the scope of the claimed subject matter.

In a preferred embodiment of the invention, a rotatable, automatically self-aligning device may be mounted on or associated with a recovery vehicle, such as a tow truck or car carrier, for supporting and pulling a load. The device includes an outer housing rigidly attached, such as by bolting or welding, to the recovery vehicle, or to an apparatus or component (e.g., a boom, an underlift, a rear tailgate, or a side portion of the recovery vehicle) associated with the recovery vehicle. The device may also include a base plate located adjacent the outer housing and capable of rotating relative to the housing, such as up to a 360° rotation, and a bearing with one or more apertures attached to, or formed as part of, the base plate. At least one shackle pinned to the one or more bearing apertures is also provided. The shackle is capable of rotating with the base plate, thereby causing the device to automatically self-align along a centerline of the shackle relative to a direction of the load when a cable threaded from the recovery vehicle through the shackle, in order to pull an attached load. The housing, base plate, bearing and shackle may each be made of high-strength steel, for example.

In alternative preferred embodiments, and in order to reduce frictional resistance between the housing and the base plate, various components may be located between the housing and the base plate, such as a wear pad, ball bearings, roller bearings, traveler rollers, etc.

In yet another preferred embodiment, components may be used to temporarily angularly lock the rotating plate in a fixed orientation relative to the housing. For example, spring-loaded detents and mating notches may be provided on the outer periphery of the housing and the plate, respectively (or vice-versa).

To allow disassembly, greasing, cleaning and re-painting, for example, the rotating base and the outer housing may be detachably connected, such as by using piano wire, which may be located within machined passages of either the housing, or the rotating plate, or both the housing and the rotating plate. Additionally, two or more fastener passages may be located about the periphery of either the housing or the rotating plate or both the housing and the rotating plate, offset from each other, to accommodate the piano wire while allowing the passages to be blocked by fasteners. The fasteners may also provide greasable passageways.

Different base plates may be used, and detachably attached to the housing. The different base plates may each have different bearings for use with shackles of different sizes or shapes. As one non-limiting example, a first bearing associated with a first base plate may have a single aperture, while a second bearing associated with a second base plate may have two or more apertures.

The D-ring assembly of the present invention may be designed to handle various loads, such as, in a non-limiting manner, loads in the range of 20,000-50,000 pounds, although for a given application, lesser or greater design loads may be accounted for in the design. The D-ring assembly may also be designed to be capable of pulling a load in any direction within 180° of the shackle.

A method for using a rotatable, automatically self-aligning device mounted on or associated with a recovery vehicle for supporting and pulling a load, also forms part of the present invention. The method may include the steps of: mounting an outer housing rigidly to the recovery vehicle, or to an apparatus or component associated with the recovery vehicle; providing a base plate adjacent the outer housing, capable of rotating relative to the housing; providing a bearing having one or more apertures, attached to, or formed as part of, the base plate; and providing at least one shackle pinned to the one or more apertures of the bearing, the shackle being capable of rotating with the base plate. A cable may be threaded from the recovery vehicle, or from another origin point, through the shackle, and attached to a load distanced from the recovery vehicle or the origin point. Pulling on the load then causes the shackle to automatically self-align along a centerline of the shackle relative to a direction of the load.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
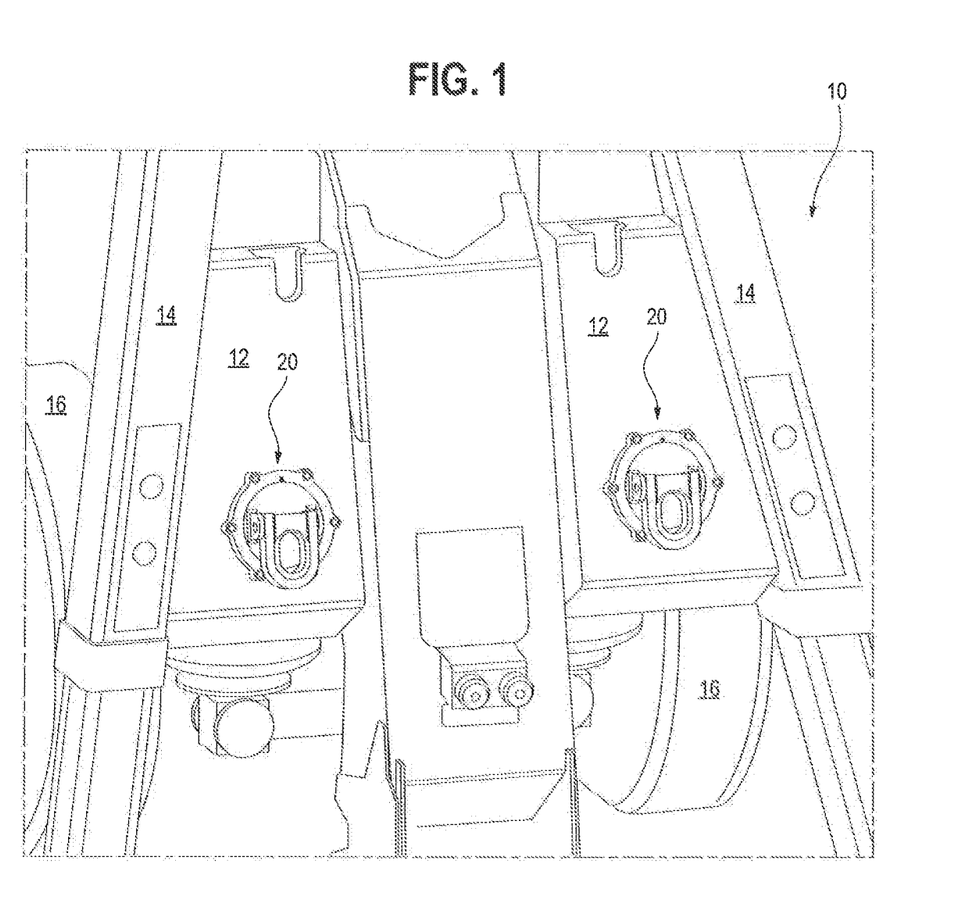
FIG. 1 is a rear partial perspective view of a tow truck equipped with a preferred embodiment of a pair of D-ring assemblies of the present invention.

Referring first to FIG. 1, the present invention generally concerns a rotating D-ring assembly located on a recovery vehicle such as a tow truck or car carrier 10, for recovering disabled vehicles. FIG. 1 shows the rear of a tow truck, with a preferred embodiment of the rotating, self-aligning D-ring assembly 20 mounted on the rear guards 12 of the chassis of the tow truck. Stabilizer legs 14 are also shown, along with tow truck tires 16. D-ring assembly 20 may be welded and/or bolted to the recovery vehicle. It will also be understood that the D-ring assembly of the present invention may be located in other positions, such as the tailgate, at the end of booms, on the side of vehicles, etc.

Figure 2:
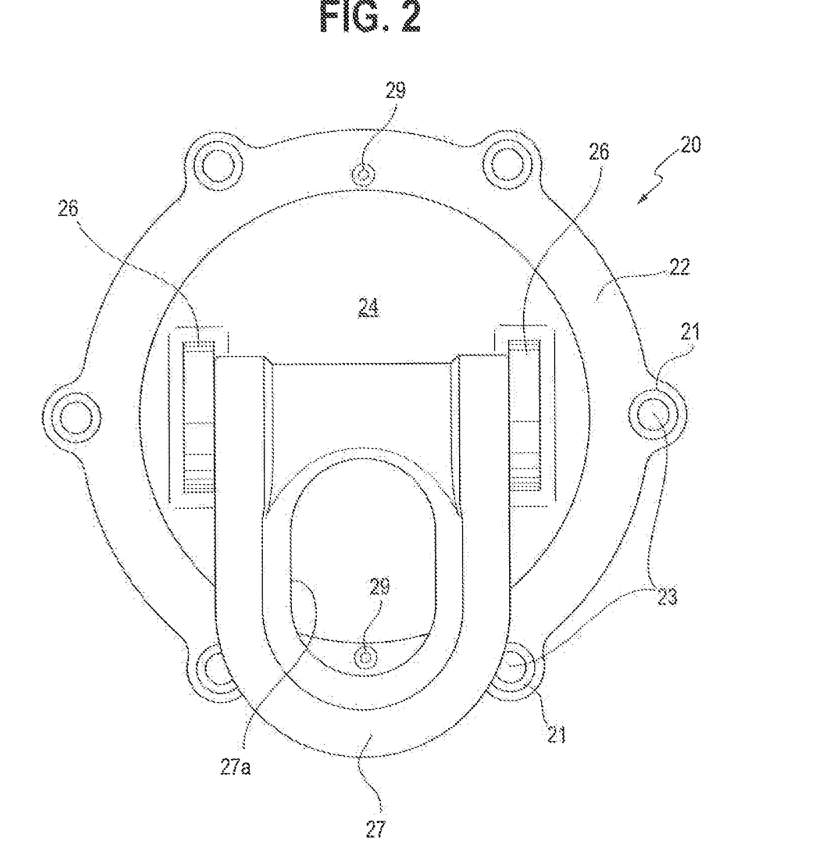
FIGS. 2-3 are front, and top and side, perspective views, respectively, of the D-ring assembly shown in FIG. 1.
Figure 3:
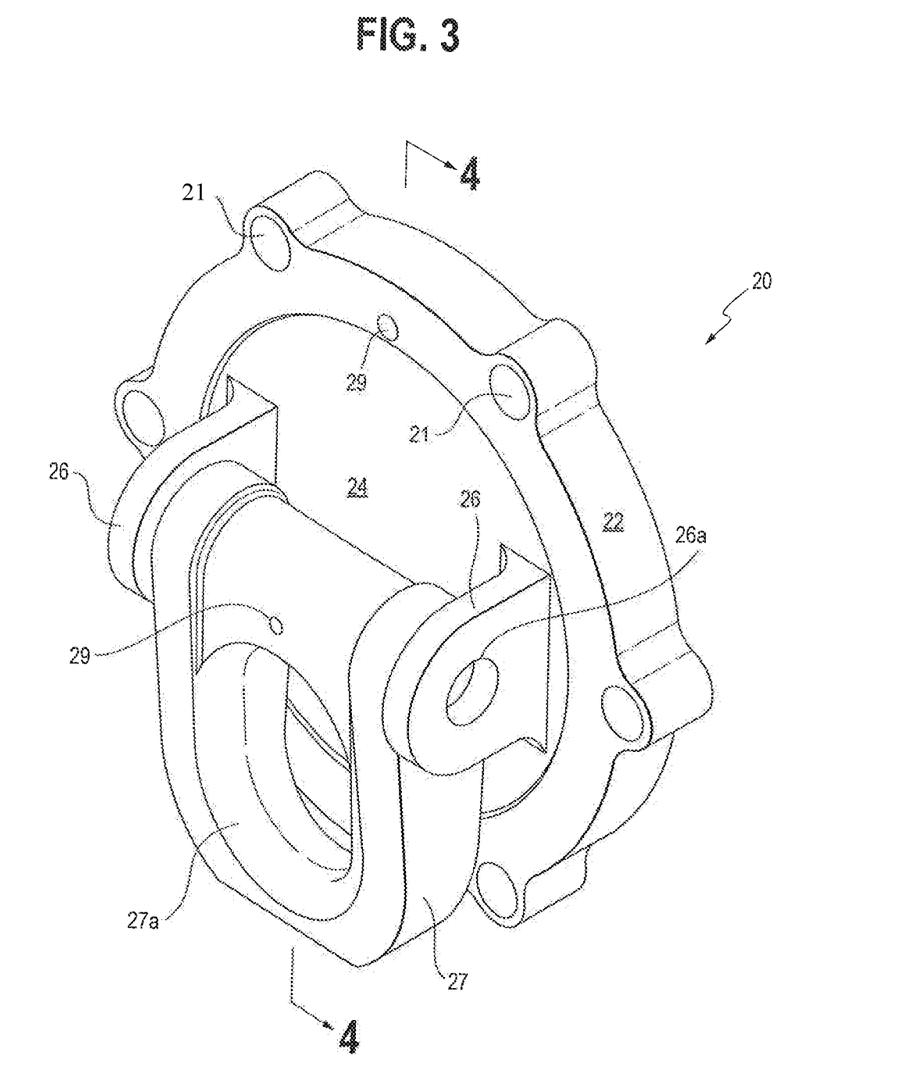

Referring to FIGS. 2-3, D-ring assembly 20 of the present invention may include an outer housing 22 with apertures 21 located about the housing, accommodating bolts 23 for rigidly fastening the D-ring assembly to the rear of the vehicle chassis. Rotatable base plate 24 may be confined in position based on the topography of the adjacent outer surfaces of housing 22 and base plate 24, such as by their interlocking geometry (e.g., referring to FIG. 4, plate outer edges 24a could be confined for rotational movement within the inner peripheral edges of housing 22). D-ring assembly 20 may also include a pin eye/bearing 26 with apertures 26a which may be welded to rotating base plate 24. Pin eye/bearing 26 carries shackle 27 with shackle aperture 27a. In different preferred embodiments, not shown, rotating base plate 24 may have different sizes and/or numbers of bearings to accommodate various sizes of D-ring shackles 27. It should be understood that while shackle 27 is referred to here as a "D-ring" in the parlance of the recovery vehicle industry, the shackle claimed below need not be in the form of a "D" and can take other general shapes.

Figure 4:
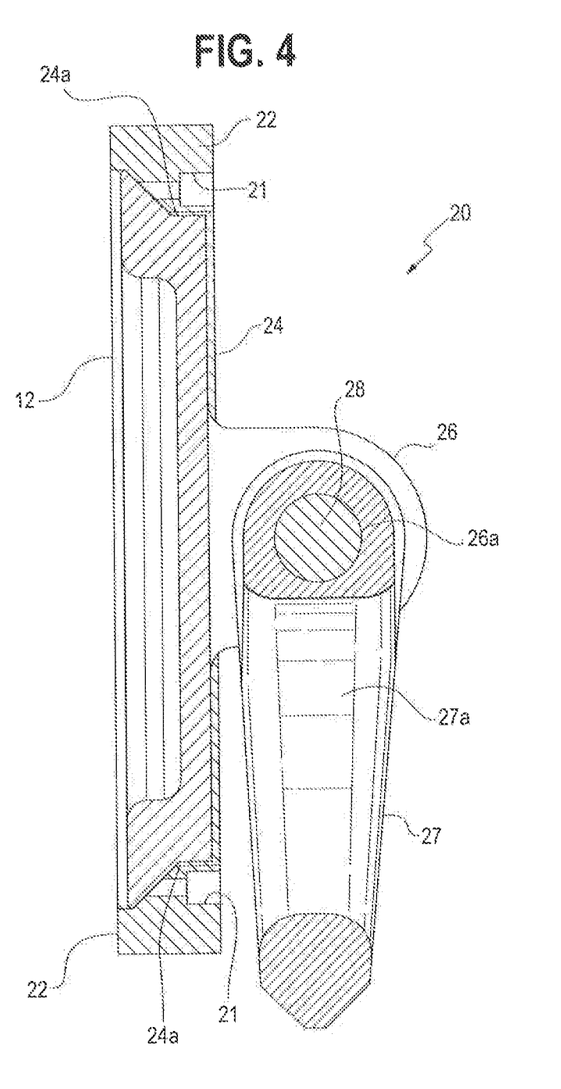
FIG. 4 is a left-side cross-sectional view of a D-ring assembly shown in FIG. 1.
Figure 5:
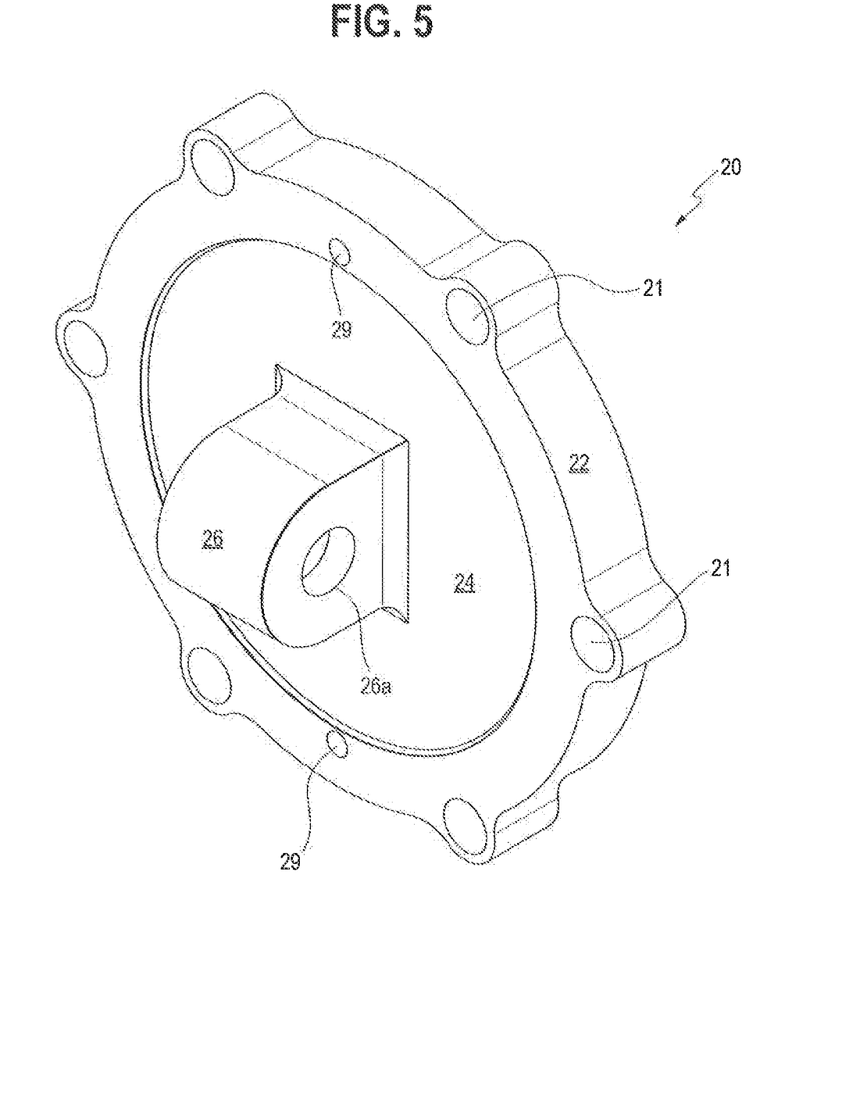
FIG. 5 is a top and side perspective view of another preferred embodiment of a D-ring assembly of the present invention.
Figure 6:
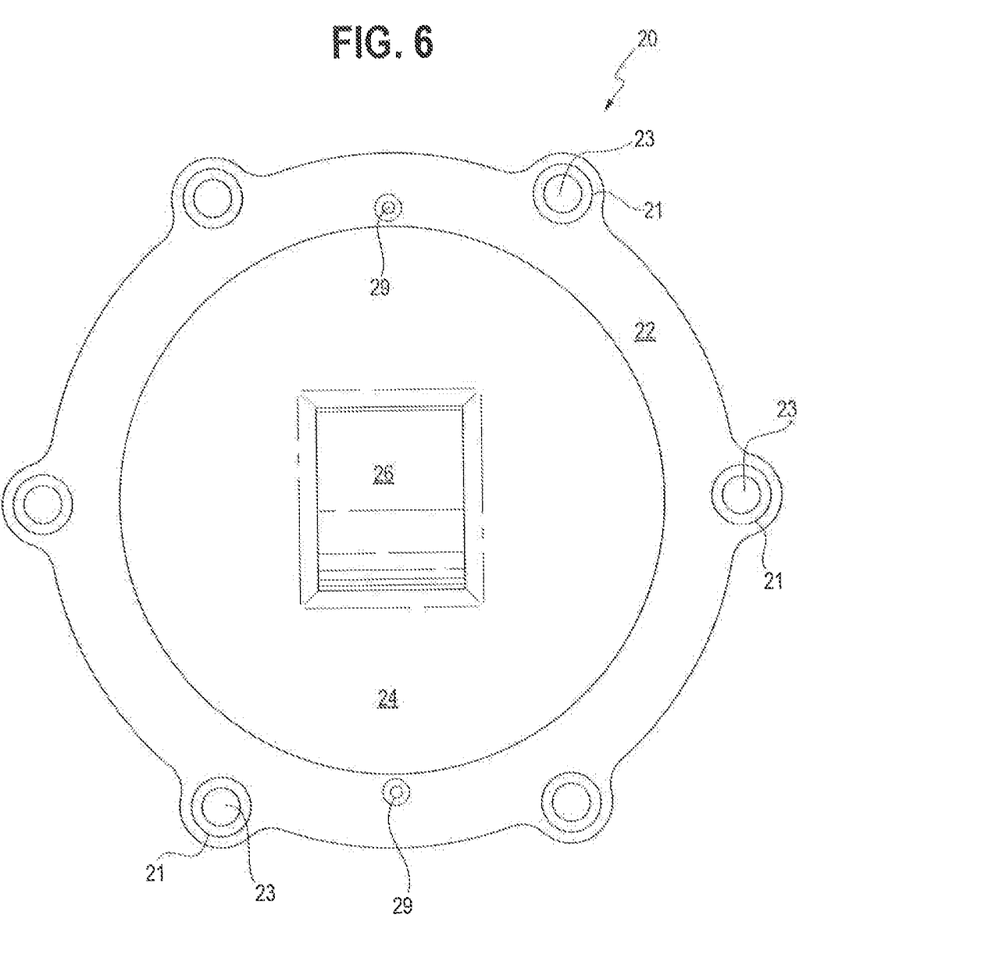
FIG. 6 is a front perspective view of the D-ring assembly shown in FIG. 5.
Figure 7:
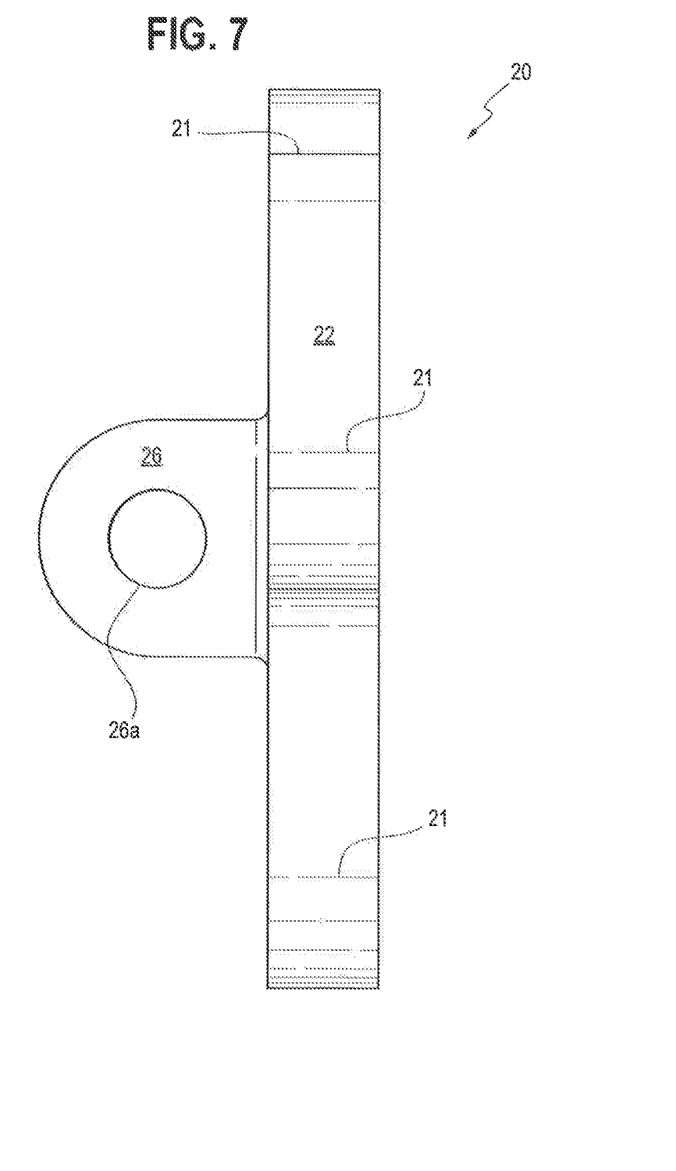
FIG. 7 is a right-side perspective view of the D-ring assembly shown in FIG. 5.

Referring to FIG. 4, pin 28 passes through bearing apertures 26a and mounts shackle 27 to bearing 26, allowing the shackle to rotate about pin 28. Referring for example to FIGS. 2-3 and 5-6, apertures 29 may be provided to accept grease for lubricating corresponding components.

Those of ordinary skill in the art will appreciate that the housing, plate, shackle and other components of the D-ring assembly of the present invention may be made of high strength steel or another hard, wearable metal such as brass.

It will be understood that because base plate 24 can rotate relative to rigid housing 22, D-ring assembly 20 is self-aligning to pull in the direction of the load (i.e., the D-ring is constructed so that it can achieve maximum load when pulled in the centerline or at the centroid of the D-ring, and the self-aligning D-ring assembly of the present invention will ensure that the load is maintained in this direction). It will also be appreciated that rotating base plate 24, which can be bolted or welded in place, spreads the load over a substantially larger surface area than the conventional D-ring whose bearing ends are directly attached to a vehicle chassis, for example.

As further explained below, D-ring 20 may take various embodiments, such as using a bearing, piano wire, frictional surface, wear pad, or spring-loaded detent.

Figure 8:
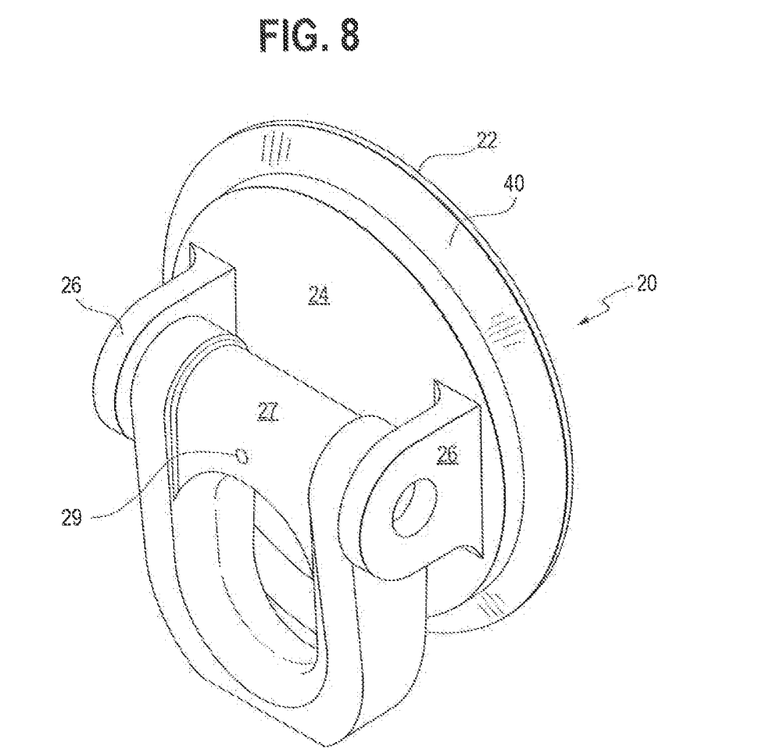
FIG. 8 is a top and side perspective view of yet another preferred embodiment of a D-ring assembly of the present invention, including a wear pad.

Referring to FIG. 8, instead of D-ring assembly embodiments in which there is metal-on-metal contact between outer housing 22 and rotating base plate 24 as in FIGS. 1-7, FIG. 8 shows a wear pad 40, which may be made of synthetic polymers, such as Nylon, HDPE, etc.

Figure 9:
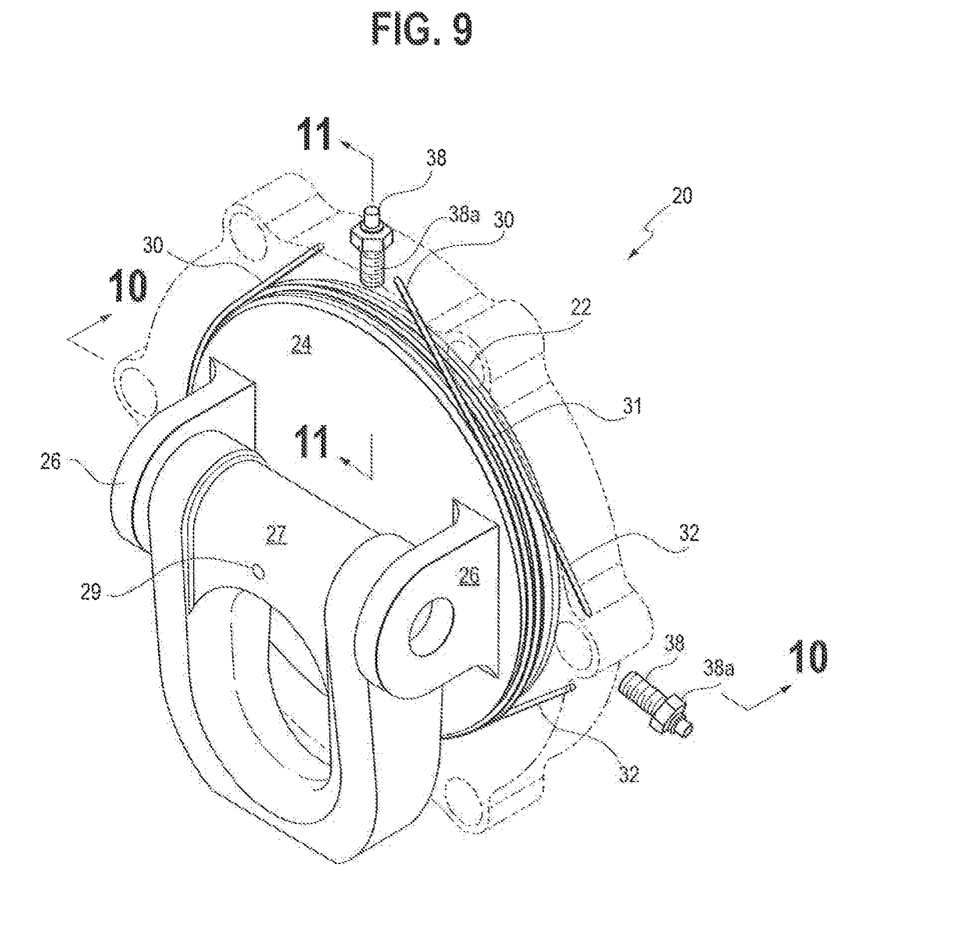
FIG. 9 is a top and side perspective view of another preferred embodiment of a D-ring assembly of the present invention, using piano wire to detachably assemble the housing and rotating base plate.
Figure 10:
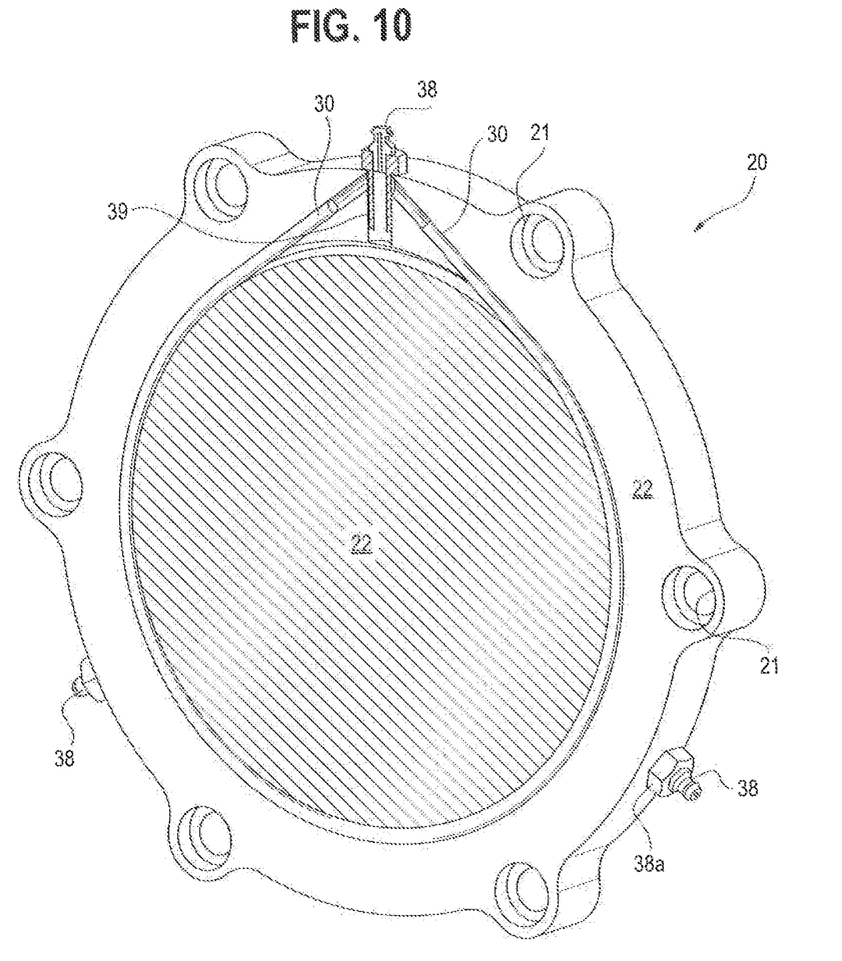
FIG. 10 is a side cross-sectional view of the D-ring assembly shown in FIG. 9, taken along reference line 10-10 of FIG. 9.
Figure 11:
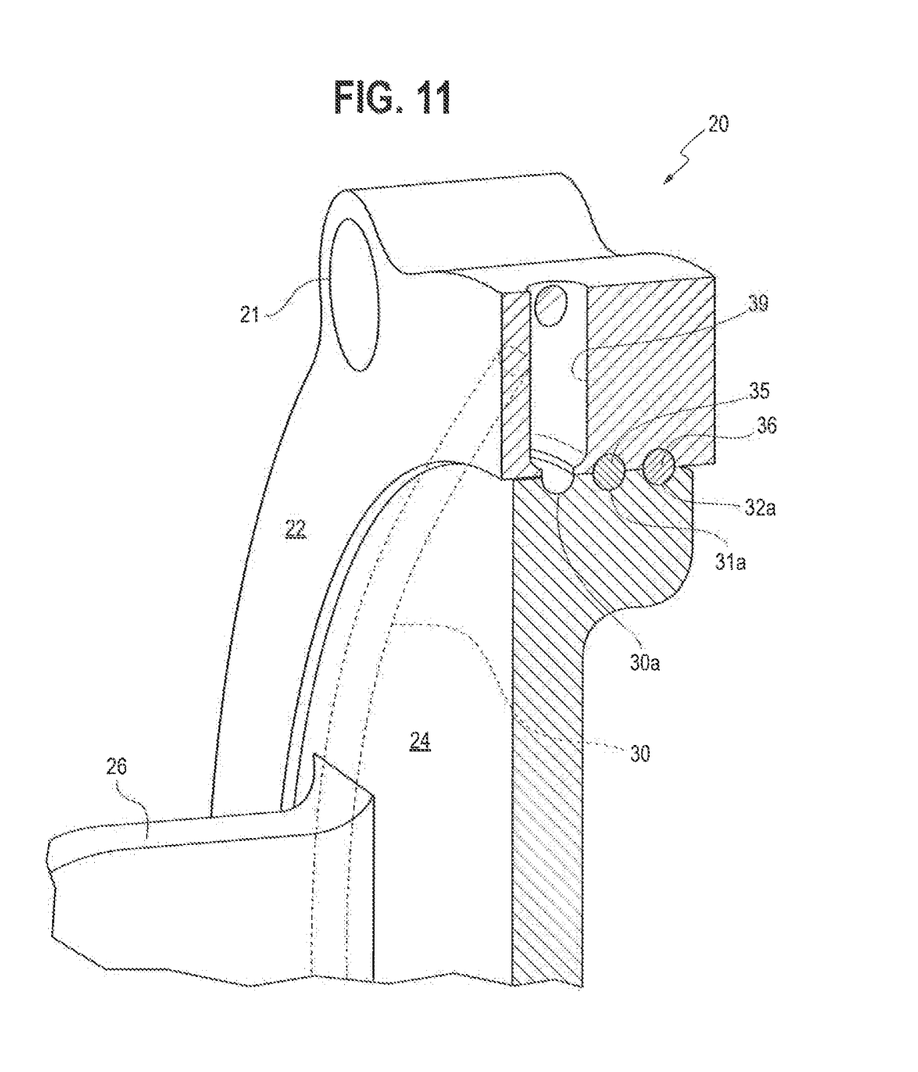
FIG. 11 is a partial, front and side cross-sectional view of the D-ring assembly shown in FIG. 9, taken along reference line 11-11 of FIG. 9.

Referring now to FIGS. 9-11, in another preferred embodiment of the D-ring assembly of the present invention, rotating plate 24 may include "piano wires" 30, 31 and 32 (e.g., a tempered high-carbon steel string, also known as spring steel) for detachably securing rotating plate 24 to outer housing 22, allowing these components to be cleaned and re-painted, for example. The intersection of outer housing 22 and rotating plate 24 may be formed to include machined channels 30a, 31a and 32a, to respectively accommodate wires 30, 31 and 32. Machined channels 34, 35 and 36 may be blocked by drilled bolts 34a, 35a and 36a, respectively, to allow entry of wires 30, 31 and 32, respectively, while greaseable passages 39 (FIG. 11) blocked by fasteners 38 (secured by nut 38a) provide entry to the wires and wire grooves in the outer housing and/or base plate. Wire entrances are offset so as to not concentrate drill passages in the outer housing. It will be understood that the machined channels may be located in only the housing, or only the rotating plate, or in both as shown.

Figure 12:
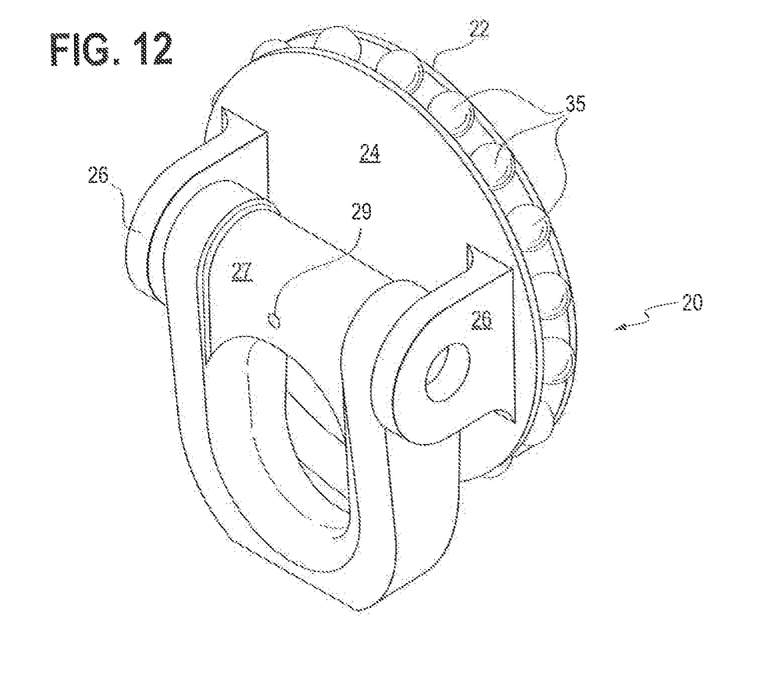
FIGS. 12-13 are top and side perspective views of still further preferred embodiments of a D-ring assembly of the present invention, showing ball bearings and roller bearings, respectively, located between the housing and rotating base plate.
Figure 13:
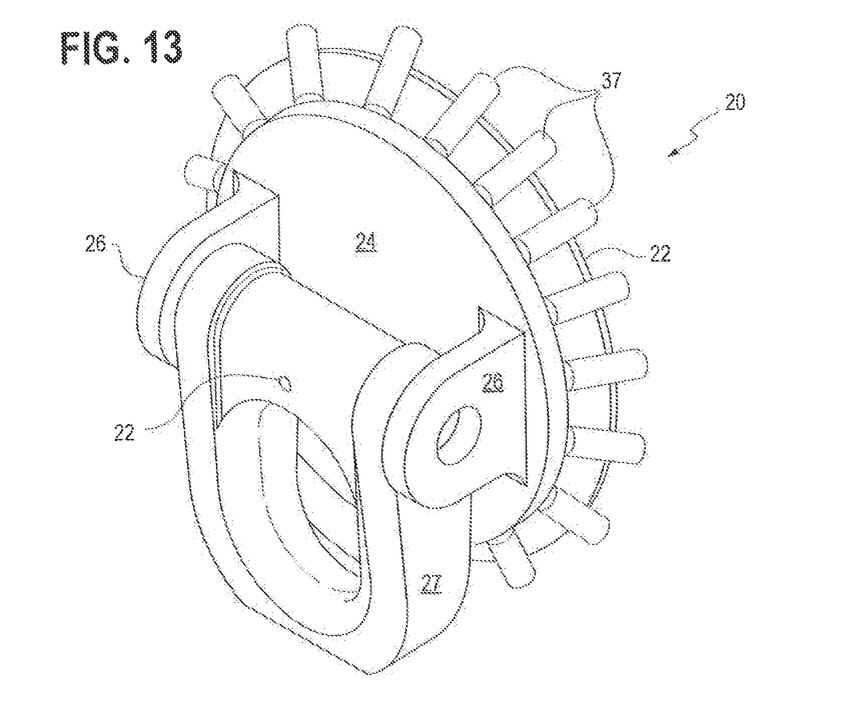

Referring to FIG. 12, another version of a rotating, self-aligning D-ring assembly is shown, with ball bearings 35 located between rotating base plate 24 and fixed outer housing 22, to decrease the friction between the plate and housing, increasing their wearability. FIG. 13 shows roller bearings 37 used instead of ball bearings 35. Of course, alternatively, other types of bearings or components could be used, such as the "traveler roller" components disclosed in U.S. Pat. No. 9,028,196, which is hereby incorporated by reference in its entirety herein.

Figure 14:
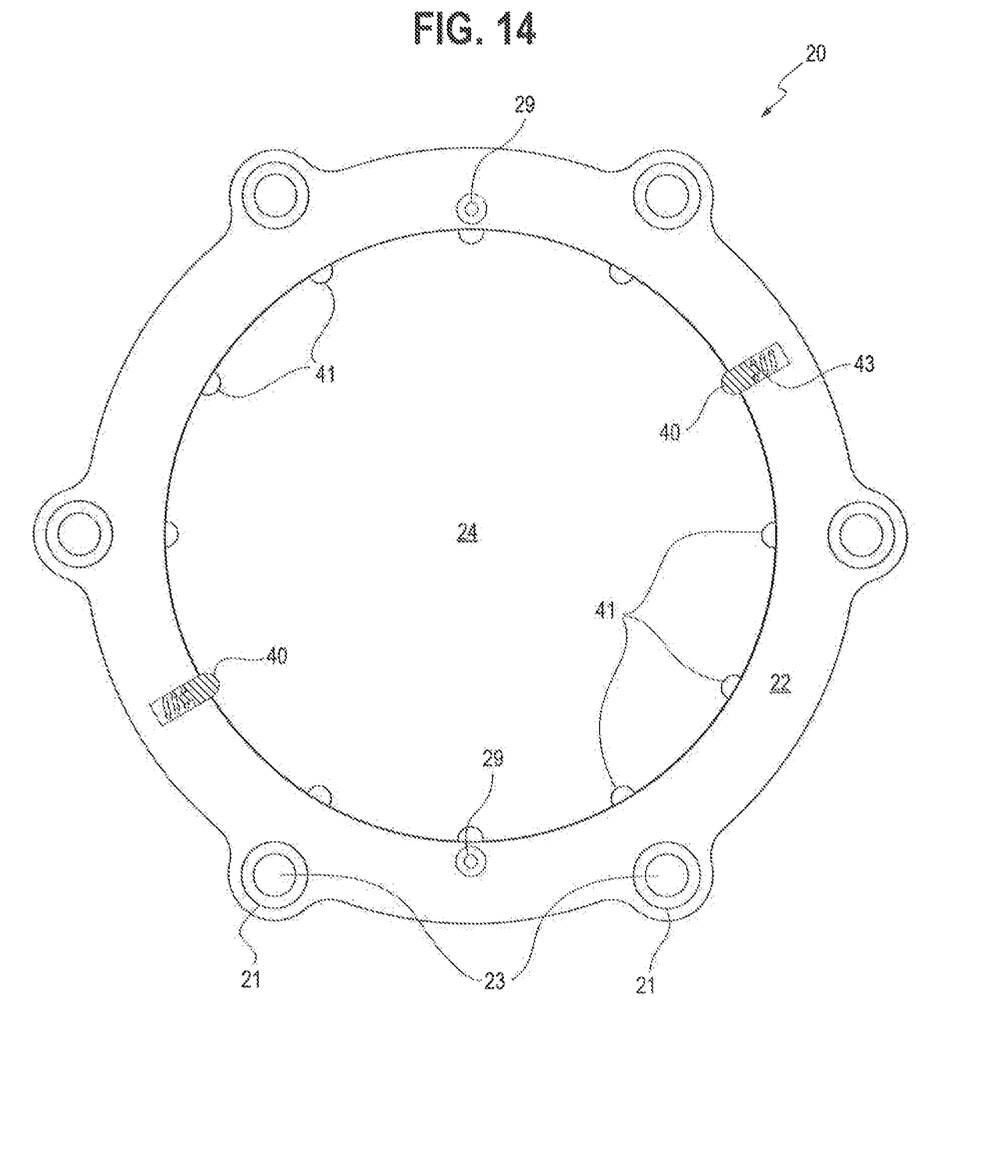
FIG. 14 is a top perspective view of another preferred embodiment of a D-ring assembly of the present invention, illustrating spring-loaded detents capable of communicating with notches to temporarily lock the rotating plate relative to the outer housing.

Referring now to FIG. 14, in this alternative embodiment of the D-ring assembly, one or more detents 40 could be used to temporarily lock rotating plate 24 into position relative to outer housing 22. In this embodiment, notches 41 may be provided on the periphery of plate 24, as shown, for selective interlocking with detents 40. (Alternatively, one or more detents could be located on the outside periphery of plate 24 and the notches could be located on the inside periphery of housing 22.) Detent 40 may be spring-loaded using spring 43, so that it is normally in a retracted position until allowed to be in an extended position when its end lies within notch 41, automatically and temporarily locking plate 24 from rotating. In order to remove 24 from its temporarily-locked position, an operator could simply exert enough rotational force to retract the detent. (For this purpose, notches 41 may be provided with slight angles on the outer walls, not shown, to allow the detent to retract. This will enable the rotatable plate to still automatically align in the direction of the applied load, while remaining in a certain angular orientation when no load is applied.)

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A rotatable, automatically self-aligning device mounted on or associated with a recovery vehicle for supporting and pulling a load, and designed to accommodate both axial and side pulls for the load, comprising:
   an outer housing rigidly attached to the recovery vehicle, or to an apparatus or component associated with the recovery vehicle, the outer housing being located in a first plane;
   a base plate confined in a second plane parallel to or coincident with the first plane and located adjacent to the outer housing, the base plate being capable of rotating relative to the outer housing;
   a structural member having one or more apertures, the structural member attached to, or formed as part of, the base plate; and
   at least one shackle pinned to the one or more apertures of the structural member, the shackle being capable of rotating with the base plate, and thereby causing the device to automatically self-align along a centerline of the shackle relative to a direction of the load when a cable threaded from the recovery vehicle through the shackle, pulls an attached load.

2. The rotating, self-aligning device of claim 1, wherein the recovery vehicle comprises a tow truck or car carrier.

3. The rotating, self-aligning device of claim 1, wherein the outer housing is attached by bolting or welding.

4. The rotating, self-aligning device of claim 1, wherein the outer housing and base plate comprise a high-strength steel.

5. The rotating, self-aligning device of claim 1, wherein a wear pad is located between the outer housing and the base plate to reduce frictional resistance between the housing and the base plate.

6. The rotating, self-aligning device of claim 1, wherein bearings are located between the outer housing and the base plate to reduce frictional resistance between the housing and the base plate.

7. The rotating, self-aligning device of claim 6, wherein the bearings comprise ball bearings or roller bearings.

8. The rotating, self-aligning device of claim 1, wherein one or more traveler rollers are located between the outer housing and the base plate to reduce frictional resistance between the housing and the base plate.

9. The rotating, self-aligning device of claim 1, comprising one or more detents associated with the outer housing or the base plate, and one or more notches associated with the base plate or the housing, for temporarily locking the base plate in a fixed orientation relative to the housing.

10. The rotating, self-aligning device of claim 1, wherein the one or more detents are spring-loaded.

11. The rotating, self-aligning device of claim 1, wherein the base plate and the outer housing are detachably connected using piano wire.

12. The rotating, self-aligning device of claim 11, wherein the piano wire is located within machined passages of either the outer housing, or the base plate, or both the outer housing and the base plate.

13. The rotating, self-aligning device of claim 11, further comprising two or more fastener passages located about the periphery of either the outer housing or the base plate, or both the outer housing and the base plate, wherein the two or more fastener passages are offset from each other, and the fastener passages can accommodate the piano wire.

14. The rotating, self-aligning device of claim 1, wherein different base plates may be detachably attached to the outer housing, and the different base plates are associated with different structural members for use with shackles of different sizes or shapes.

15. The rotating, self-aligning device of claim 14, wherein a first structural member associated with a first base plate has a single aperture, and a second structural member associated with a second base plate has two or more apertures.

16. The rotating, self-aligning device of claim 1, wherein the device is designed to handle a load in the range of 20,000-50,000 pounds located in any direction within 180° of the device.

17. The rotating, self-aligning device of claim 1, wherein the apparatus comprises one or more of the following: a boom; an under lift; a rear tailgate; a side portion of the recovery vehicle.

18. The rotating, self-aligning device of claim 1, wherein the base plate is capable of 360° rotation.

19. A method for using a rotatable, automatically self-aligning device mounted on or associated with a recovery vehicle for supporting and pulling a load, and designed to accommodate both axial and side pulls for the load, comprising the steps of:

mounting an outer housing rigidly to the recovery vehicle, or to an apparatus or component associated with the recovery vehicle;

providing a base plate adjacent the outer housing, wherein the base plate is capable of rotating relative to the outer housing;

providing a structural member having one or more apertures, the structural member being attached to, or formed as part of, the base plate;

providing at least one shackle movably attached to the one or more apertures of the structural member, the shackle being capable of rotating with the base plate;

threading a cable from the recovery vehicle, or from another origin point, through the shackle, and attaching the cable to a load distanced from the recovery vehicle or the origin point; and pulling on the load, thereby causing the device to automatically self-align along a centerline of the shackle relative to a direction of the load.

* * * * *